United States Patent
McDonald et al.

(10) Patent No.: US 9,120,684 B2
(45) Date of Patent: Sep. 1, 2015

(54) CHEMICAL/BIOCHEMICAL WATER PURIFICATION REACTOR AND METHOD OF IMPLEMENTING SAME

(76) Inventors: Robert R. McDonald, Holland, MI (US); William O. Jones, Traverse City, MI (US); Michael Pikaart, Holland, MI (US)

(*) Notice: Subject to any disclaimer, the term of this patent is extended or adjusted under 35 U.S.C. 154(b) by 1047 days.

(21) Appl. No.: 12/299,586

(22) PCT Filed: Oct. 13, 2008

(86) PCT No.: PCT/US2008/079701
§ 371 (c)(1),
(2), (4) Date: Apr. 20, 2011

(87) PCT Pub. No.: WO2010/044769
PCT Pub. Date: Apr. 22, 2010

(65) Prior Publication Data
US 2012/0175310 A1    Jul. 12, 2012

(51) Int. Cl.
*C02F 1/50* (2006.01)
*C02F 3/06* (2006.01)
(Continued)

(52) U.S. Cl.
CPC .............. *C02F 1/001* (2013.01); *C02F 1/004* (2013.01); *C02F 3/104* (2013.01); *G06Q 99/00* (2013.01); *C02F 1/505* (2013.01); *C02F 3/06* (2013.01); *C02F 2201/008* (2013.01)

(58) Field of Classification Search
CPC .................... C02F 2201/008; C02F 2003/001; C02F 2003/003; C02F 3/10; C02F 3/104; C02F 3/105; C02F 3/106; C02F 3/107; B01D 23/02; B01D 23/10; B01D 23/14
See application file for complete search history.

(56) References Cited

U.S. PATENT DOCUMENTS

| 2,723,761 | A | * | 11/1955 | Van Der Made et al. | ...... 210/196 |
| 3,649,532 | A | * | 3/1972 | McLean | ........................ 210/718 |

(Continued)

FOREIGN PATENT DOCUMENTS

| JP | 14263641 A | 9/2002 |
| KR | 1020040049378 A | 6/2004 |

(Continued)

OTHER PUBLICATIONS

Inactivation of Influenza A Virus on Copper versus Stainless Steel Surfaces; J.O. Noyce, H. Michels, and C.W. Keevil; Applied and Environmental Microbiology, Apr. 2007, p. 2748-2750; Copyright 2007, American Society for Microbiology, USA.

(Continued)

*Primary Examiner* — Lucas Stelling
(74) *Attorney, Agent, or Firm* — Michael F Kelly PLLC

(57) ABSTRACT

A water purifier includes a chamber having a perimetric wall, a bottom wall at a first end, and an opening at a second, opposed end. A collection pipe extends along the bottom wall. A siphon pipe fluidly coupled with the collection pipe extends along the perimetric wall away from the bottom wall. An exit pipe fluidly coupled with the siphon pipe extends through a perimetric wall discharge opening. A layer of granular material in the chamber contains and sustains a biological layer of microorganisms for reducing water-borne pathogenic microorganisms. An inorganic anti-microbial disinfectant source is incorporated into a portion of the granular material. The granular material and biological layer provide progressive biochemical remediation of pathogenic microorganisms. The inorganic disinfectant source provides progressive chemical and biochemical remediation of pathogenic microorganisms. Water containing pathogenic microorganisms percolates through the granular material, and flows into and discharges from the pipes as potable water.

12 Claims, 3 Drawing Sheets

(51) Int. Cl.
  *C02F 3/10*   (2006.01)
  *C02F 1/00*   (2006.01)
  *G06Q 99/00*  (2006.01)

(56) References Cited

U.S. PATENT DOCUMENTS

| 4,765,892 A | 8/1988 | Hulbert et al. |
| 5,993,672 A | 11/1999 | Manz |
| 6,123,858 A | 9/2000 | Manz |

FOREIGN PATENT DOCUMENTS

| WO | 98/38134 | 9/1998 |
| WO | 00/21635 | 4/2000 |
| WO | 2008/080214 | 7/2008 |
| WO | WO2012025943 A1 * | 3/2012 |

OTHER PUBLICATIONS

Inactivation of *E. coli* and coliform bacteria in traditional brass and earthernware water storage vessels; Puja Tandon, Sanjay Chhibber, and Robert H. Reed, Dec. 8, 2004; Springer 2005; Antonie van Leeuwenhoek (2005) 88:35-48, DOI 10.1007/s10482-004-7366-6, UK and India.

Slow Sand Filtration; L. Huisman and W.E. Wood; World Health Organization, ISBN 92 4 154037 0, 1974, printed in Belgium.

ASTM International Standardization News, 100 Barr Harbor Dr., PO Box C700, West Conshohocken, PA 19428, Oct. 2006; Harold T. Michels, Ph.D., USA.

Potential use of copper surfaces to reduce survival of epidemic meticillin-resistant *Staphylococcus aureus* in the healthcare environment; J.O. Noyce, H. Michels, C.W. Keevil, Journal of Hospital Infection (2006) 63, 289-297; Elsevier Health, UK and USA.

* cited by examiner

CHEMICAL/BIOCHEMICAL WATER PURIFICATION REACTOR AND METHOD OF IMPLEMENTING SAME

CROSS-REFERENCE TO RELATED APPLICATIONS

This application claims priority on International Application No. PCT/US2008/079701, filed Oct. 13, 2008, which is incorporated herein in its entirety.

BACKGROUND OF THE INVENTION

1. Field of the Invention

The invention relates to a water purification reactor for converting water containing an elevated concentration of pathogenic microorganisms into potable water.

2. Description of the Related Art

Potable water is essential for life. While natural potable water sources have been available in the past, reliable sources of untreated, potable water are today virtually nonexistent. This is particularly true in undeveloped countries, primarily along the equator. Water sources in such countries frequently contain pathogenic microorganisms at concentrations that far exceed widely accepted drinking water standards. The World Health Organization estimates that approximately 1.2 billion people worldwide are directly without clean water, and 2.6 billion are without proper sanitation. Furthermore, U.S. AID notes that, in many countries, 80% of illnesses in the population is due to water-borne pathogens. Tragically, because of their immature immune systems, children in developing countries under 5 years of age are particularly impacted by fecally polluted water: 1 child in 5 dies, and 2 of the remaining 4 children are permanently disabled.

Developed countries have responded to a diminished availability of potable water sources by designing and fabricating water treatment facilities that can provide potable water in sufficient quantities and at reasonably affordable costs to serve a human population that may exceed many tens of thousands. Such facilities are affordable, in part, due to economy of scale. The larger the population served by a water treatment facility, and consequently the larger the facility, the more economical such facilities become per capita.

In undeveloped countries, where populations, i.e. villages, settlements, etc., may be relatively isolated and small, appropriate scale conventional water treatment facilities will generally be too expensive. Furthermore, resources for development and operation of a conventional state-of-the-art treatment facility will generally not be available to a local population. Large-scale water treatment facilities are particularly uneconomical and impractical for small and/or rural populations. Even if a water treatment facility could be designed and sited to support several villages, construction and operation would still generally be unaffordable. Meanwhile, the adverse effects of non-potable water on human health continue. Populations in undeveloped countries have no choice but to consume water failing to meet applicable drinking water standards.

SUMMARY OF THE INVENTION

A water purification reactor for remediating pathogenic microorganisms in water comprises a containment vessel, a discharge assembly, a water purification medium, and a disinfectant. The containment vessel has a perimetric wall, a first end having a bottom wall, and a second opposed end defining an opening. The perimetric wall has a discharge opening therethrough. The perimetric wall and the bottom wall define a chamber.

The discharge assembly is associated with the chamber, and comprises a collection pipe extending along the bottom wall, a siphon pipe fluidly coupled with the collection pipe and extending along the perimetric wall away from the bottom wall, and an exit pipe fluidly coupled with the siphon pipe and extending through the discharge opening. The water purification medium comprises at least one layer of granular material contained within the chamber. The disinfectant has anti-microbial properties and is incorporated into a portion of the water purification medium. The water purification medium is adapted for progressive biochemical remediation of the pathogenic microorganisms. The disinfectant is adapted for progressive chemical and biochemical remediation of the pathogenic microorganisms. Water containing pathogenic microorganisms can percolate through the water purification medium, and flow into and discharge from the discharge assembly as potable water.

A water purifier includes a chamber having a perimetric wall, a bottom wall at a first end, and an opening at a second, opposed end. A collection pipe extends along the bottom wall. A siphon pipe fluidly coupled with the collection pipe extends along the perimetric wall away from the bottom wall. An exit pipe fluidly coupled with the siphon pipe extends through a perimetric wall discharge opening. A layer of granular material in the chamber contains and sustains a biological layer of microorganisms for reducing water-borne pathogenic microorganisms. An inorganic anti-microbial disinfectant source is incorporated into a portion of the granular material. The granular material and biological layer provide progressive biochemical remediation of pathogenic microorganisms. The inorganic disinfectant source provides progressive chemical and biochemical remediation of pathogenic microorganisms. Water containing pathogenic microorganisms percolates through the granular material, and flows into and discharges from the pipes as potable water.

DESCRIPTION OF AN EMBODIMENT OF THE INVENTION

Figure 1:
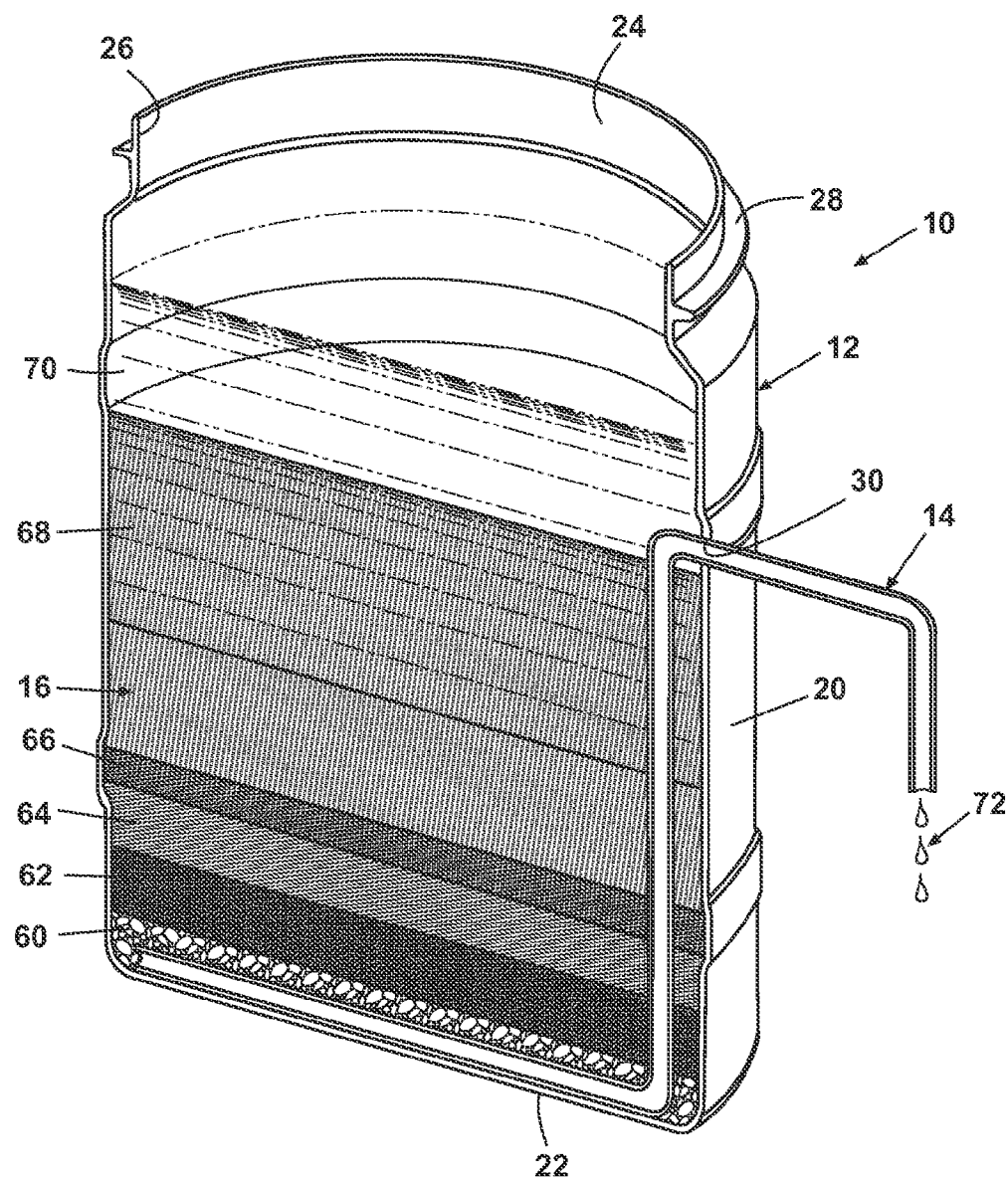
FIG. 1 is a sectional view of an embodiment of the invention comprising a chemical/biochemical water purification reactor having a containment vessel, a water discharge assembly, and a water purification medium.

Referring now to the drawings, and in particular to FIG. 1, an embodiment of the invention comprises a chemical/biochemical water purification reactor 10. FIG. 1 illustrates the water purification reactor 10 in diametric section for clarity, but it should be understood that the water purification reactor 10 comprises two conjoined halves identical to the half illustrated in FIG. 1. The reactor 10 comprises a containment vessel 12, a discharge assembly 14, and a purification medium 16. The water purification reactor 10 can treat contaminated water having a high concentration of pathogenic microorganisms, such as *E. coli* and total fecal coliform count (TFCC), by introducing contaminated water into the containment vessel 12 where it can pass through the purification medium 16, and discharge from the discharge assembly 14 as potable water.

The containment vessel 12 is illustrated as a somewhat cylindrical vessel, such as a drum, comprising a cylindrically arcuate perimetric wall 20 terminating at a first end in a circular bottom wall 22, and at a second end in an annular lip 24 defining a circular opening 26. The perimetric wall 20 and bottom wall 22 define a chamber 32 into which the opening 26 provides access. The containment vessel 12 is also illustrated having a perimetric flange 28 disposed somewhat away from the opening 26. The perimetric flange 28 can provide reinforcement of that portion of the perimetric wall 20 adjacent the opening 26, and can also provide support for a circular lid (not shown) installed over the opening 26. The perimetric wall 20 is provided with an opening 26 extending therethrough for purposes which will be described hereinafter.

The containment vessel 12 can be specially fabricated for use as a chemical/biochemical water purification reactor. The containment vessel 12 can alternately be a recycled container, such as a drum previously utilized for shipping other goods, a 30 or 40 gallon waste container, a section of pipe having an added closed end, and the like. The containment vessel 12 need not be cylindrical, and the shape can be that provided by readily-available, economical containers, such as square, rectangular, polygonal, hemispherical, and the like. The containment vessel 12 can also be fabricated of any material that is non-toxic, having sufficient strength and durability for the purposes intended, such as iron, steel, plastic, concrete, and the like. Reinforcing elements can also be incorporated into the perimetric wall 20 or bottom wall 22 as appropriate for the wall material selected.

The containment vessel 12 can be of a size sufficient to produce potable water in a preselected quantity. Thus, the containment vessel 12 may be relatively large, having a relatively high volume, if, for example, a single water purification reactor is to serve a number of users, such as several families, or a small town. Alternatively, the containment vessel 12 may be relatively small, having a relatively low volume, if the water purification reactor is to serve a single family.

Figure 2:
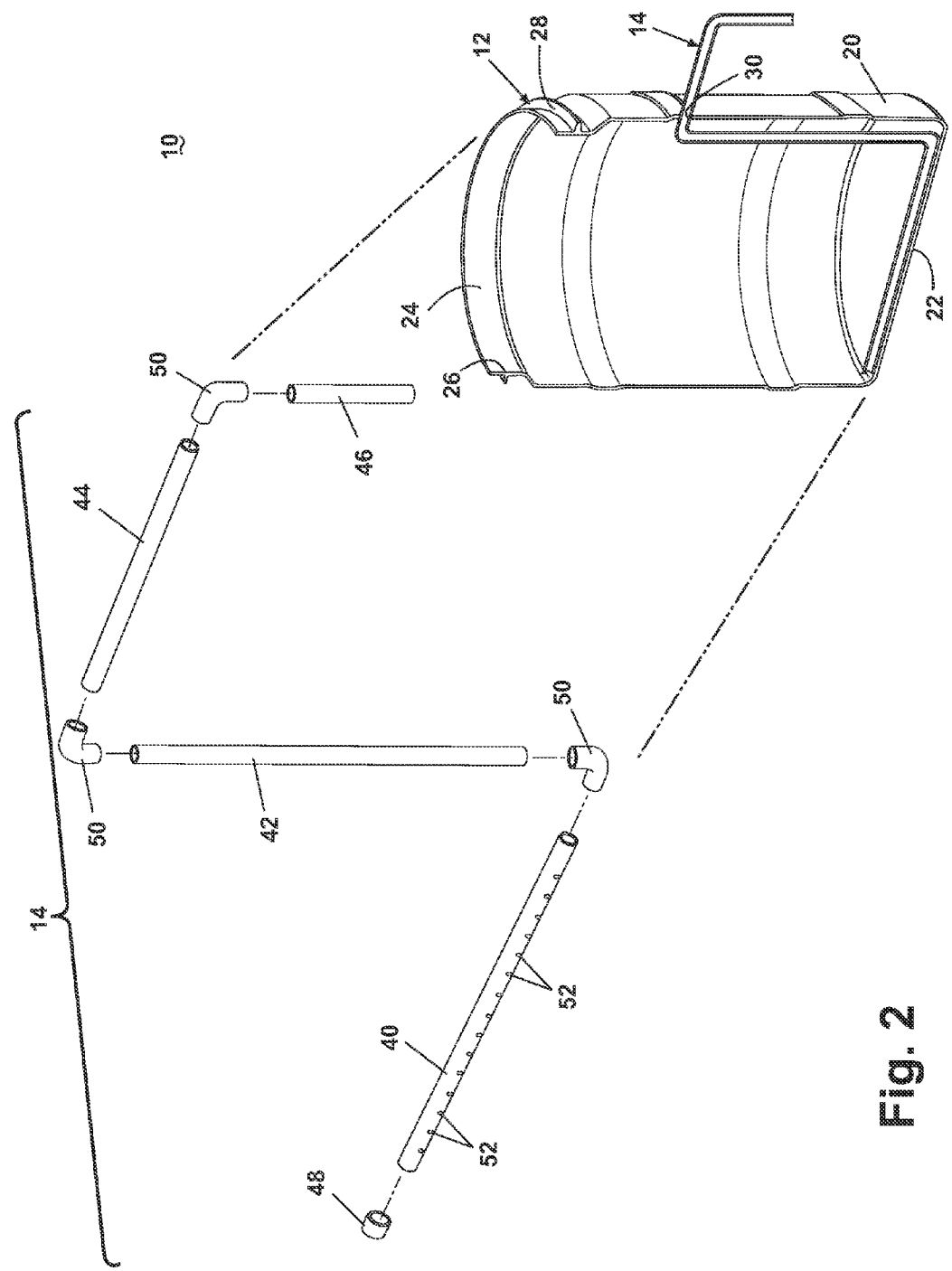
FIG. 2 is an exploded view of the water discharge assembly illustrated in FIG. 1.

Referring also to FIG. 2, the discharge assembly 14 comprises a collection pipe 40, a siphon pipe 42, an exit pipe 44, and a delivery pipe 46, coupled together with elbow fittings 50. The collection pipe 40 has a length approximately equal to the inner diameter of the containment vessel 12. A first end of the collection pipe 40 is closed with an end cap 48. A second end of the collection pipe 40 is coupled with a first elbow fitting 50. A plurality of inlet apertures 52 are provided through the wall of the collection pipe 40, longitudinally along the pipe 40. A single line of inlet apertures 52 is illustrated. However, 2 or more lines of inlet apertures 52 can be provided in accordance with the flow through the water purification reactor 10. The elbow fitting 50 can be oriented so that the orientation of the inlet apertures 52 optimizes the collection of water flowing through the purification medium 16, and the siphon pipe 42 can extend essentially longitudinally along the perimetric wall 20 from the collection pipe 40 toward the opening 26.

The siphon pipe 42 can extend from the collection pipe 40 to an elevation somewhat lower than the elevation of the discharge opening 30. The length of the siphon pipe 42 can be selected so that the siphon pipe 42 can be coupled at a first end with the first elbow fitting 50, and at a second end with a first end of the exit pipe 44 through a second elbow fitting 50 so that the exit pipe 44 can extend through the discharge opening 30 generally parallel with the collection pipe 40. Optionally, a delivery pipe 46 can be coupled to a second end of the exit pipe 44 through a third elbow fitting 50 to extend generally downwardly to facilitate filling of containers and minimize the introduction of foreign substances into the discharge assembly 14.

The discharge assembly 14 can be fabricated of non-toxic pipe having sufficient size, strength, and durability for the purposes intended. Suitable pipe can include pipe meeting applicable standards for conveying potable water, such as plastic, iron, or copper. Selection of an appropriate pipe material can be based on cost, workability, availability, and the like.

Referring again to FIG. 1, the purification medium 16 comprises a granular material such as sand and gravel in a layered configuration. The granular material comprising each layer can differ in a physical property, i.e. grain size, a chemical property, or both. The first layer, placed on the bottom wall 22, comprises a coarse gravel base layer 60. This is overlain by a pea gravel layer 62, which in turn is overlain by a coarse sand layer 64. Above the coarse sand layer 64 is a fine sand layer 66, 68.

The gravel base layer 60 comprises a nominal 1-inch gravel. The pea gravel layer 62 comprises a nominal $\frac{1}{2}$" gravel. The coarse sand layer 64 comprises a nominal $\frac{1}{8}$" particle size. The fine sand layer 66, 68 comprises a nominal $\frac{1}{32}$" particle size. Thus, the gravel base 60 has a grain size distribution between 1-inch and $\frac{1}{2}$", the pea gravel 62 has a grain size distribution between $\frac{1}{2}$" and $\frac{1}{8}$", the coarse sand 64 has a grain size distribution between $\frac{1}{8}$" and $\frac{1}{32}$", and the fine sand 66, 68 has a grain size distribution smaller than $\frac{1}{32}$".

All material is segregated according to size, and washed to remove all smaller particles, i.e. sand, silt, and clay, that may be mixed in with or adhering to the gravel and sand particles. The particle sizes are selected, in part, to minimize the migration into each layer of overlying smaller particles, which can disrupt the remediation process and reduced the flow of potable water.

The sand and gravel utilized for the purification medium 16 can be purchased if economical to do so. Alternatively, local sources of native material can be processed utilizing suitably-sized screens and a washing apparatus to produce sand and gravel of the required sizes, if a suitable local source is readily available.

The sand and gravel layers must be carefully deposited in the containment vessel 12 to provide the desired remediation. For example, a 70-100 liter containment vessel 12 should have a coarse gravel base layer 60 of about 3-5 cm thickness overlying the collection pipe 40. The same thickness, i.e. about 3-5 cm, pea gravel layer 62 should overlie the coarse gravel base layer 60. The coarse sand layer 64 should also have a thickness of about 3-5 cm. The fine sand layer 66, 68 should be of a sufficient thickness to reach the bottom of the elbow fitting 50 coupling the siphon pipe 42 with the exit pipe 44. In other words, the elevation of the exit pipe 44 should be somewhat greater than the top surface of the purification medium 16. For the 70-100 liter containment vessel 12, the thickness of the fine sand layer 66, 68 should therefore be about 35-45 cm. It should be understood, however, that layer thickness will be dependent upon the containment vessel size, its configuration, and the surface area required for remediation of the polluted water.

A portion of the fine sand layer 66, 68 immediately overlying the coarse sand layer 64 can be separately mixed with a disinfectant, and placed as a separate fine sand/disinfectant layer 66 over the coarse sand layer 64. The thickness of the fine sand/disinfectant layer 66 should be about 2-4 cm. The remaining fine sand without the disinfectant can be placed over the layer 66 as a separate fine sand layer 68.

Metals and metal salts providing varying degrees of disinfectant activity include gold, silver, copper, zinc, cadmium, mercury, nickel, cobalt, iron, manganese, chromium, tin, lead, arsenic, bismuth, and beryllium. Preferred metallic compounds for use in the fine sand/disinfectant layer 66 include those comprising copper and silver, such as copper salts, copper-zinc alloys, and activated charcoal impregnated with silver. At concentrations providing effective anti-microbial activity, copper and silver compounds have a minimal risk of adverse impact on human health and safety. The quantity of disinfectant should typically provide metal ions in solution at concentrations of between 0.5 and 1.5 ppm.

The discharge assembly 14 is first installed in the containment vessel 12 so that the collection pipe 40 extends diametrically across the bottom wall 22 with the inlet apertures 52 oriented laterally along the mid-height of the collection pipe 40, the siphon pipe 42 extends upwardly along the perimetric wall 20 to the discharge opening 30, and the exit pipe 44 extends through the discharge opening 30. Any space between the discharge opening 30 and the exit pipe 44 can be filled with a suitable material providing a water tight seal to prevent untreated water from passing through such space.

The purification medium 16 is then placed in the containment vessel 12, beginning with the coarse gravel base layer 60. The coarse gravel base layer 60 should be placed to completely surround the collection pipe 40, utilizing care so as not to damage the collection pipe 40. The pea gravel layer 62 is then placed over the coarse gravel base layer 60 to form a layer having a top surface generally parallel with the bottom wall 22 and a generally constant thickness. The coarse sand layer 64 is then placed over the pea gravel layer 62 also to form a layer having a top surface generally parallel with the bottom wall 22 and a generally constant thickness.

The metal-based disinfectant is mixed into a quantity of fine sand and the mixture is placed over the coarse sand layer 64 to form the fine sand/disinfectant layer 66. This is followed by placement of additional fine sand without the disinfectant, in fractional quantities, over the fine sand/disinfectant layer 66 to form the fine sand layer 68.

Prior to placement of the first portion of the fine sand layer without the disinfectant 68, water should be added to the purification medium 16 in the containment vessel 12 to eliminate air pockets that may be trapped within the interstitial spaces of the sand and gravel layers. The water should be dispersed over the purification medium 16 such as by a colander, a sieve, hand sprinkling, and the like, so as to eliminate the formation of channels in the layers. The addition of water should be continued intermittently until all of the fine sand layer 68 has been placed. During placement of the fine sand layer 68, the side of the containment vessel 12 can be struck to help dislodge any air pockets within the purification medium 16.

The top surface of the fine sand layer 68 should extend precisely to the level of the bottom of the second elbow fitting 50 to continuously maintain a 2-3 cm layer of water over the reactor bed to protect the biota that are resident at the top of the bed. Additional water should then be dispersed over the fine sand layer 68 until the water is at the level of the top of the exit pipe 44, and water begins to flow from the delivery pipe 46.

For a 70-100 liter containment vessel 12, the approximate quantities of material are 6 liters each of the 1-inch gravel, pea gravel, and coarse sand, and 36 liters of fine sand. The quantity of the typical disinfectant is approximately 135 g or ¼ cup.

The chemical/biochemical water purification reactor 10 must be "seasoned" before placing it in use. For a period of 20 days, approximately 18 liters of contaminated water 70 from the prospective water source should be added to the water purification reactor 10 daily, and the water 72 discharged from the reactor 10 should be considered untreated and unfit for consumption. After 20 days, the water purification reactor 10 should be fully functional, and the water 72 discharged from the reactor 10 should meet applicable drinking water standards.

For continued effectiveness, contaminated water 70 should be added daily to the water purification reactor 10. A daily total of approximately 36 liters should be added in 2 charges of approximately 18 liters apiece at different times of the day. The water 70 should be dispersed as previously described herein so as not to disturb the fine sand layer 68 and avoid channeling. The maximum daily throughput is related to the total reactor bed volume, and increases in direct proportion to an increase in reactor bed volume.

For the 70-100 liter water purification reactor 10 described previously herein, the flow rate output should be approximately 1 liter per minute.

In a conventional slow sand filter, a thin biological layer, known as a "schmutzdecke," will develop along the top surface of the sand. The schmutzdecke, and the microorganisms living therein, constitute the primary water purification element in a slow sand filter. Contaminated water must pass through the schmutzdecke before entering the underlying sand. The microorganisms that naturally form in the schmutzdecke intercept, digest, and break down organic matter contained in the contaminated water. Living bacteria, and any dead algae that may be present, are consumed within the schmutzdecke in a process that results in the formation of simple inorganic salts. At the same time, the nitrogen compounds are broken down and nitrogen is oxidized.

After the water passes from the schmutzdecke into the sand, adsorption of the water occurs, primarily as a consequence of the interstitial spaces existing throughout the sand. As the water flows downwardly through the sand, it passes over the surfaces of the sand grains. When the water enters an interstitial space, its flow is slowed, enabling microscopic particles, including bacteria and viruses, to precipitate out of the water and settle on individual sand grains. The particles are retained on the surfaces of the sand grains through mechanisms such as mass attraction or electrical forces. The adsorbed particles form a biological layer around each sand grain similar to the schmutzdecke, which is termed the "zoogeal." Microorganisms in this biological layer feed on adsorbed contaminants and on each other. Different microorganisms are dispersed throughout the sand at different depths.

Organic particles are held within the biological layer until broken down, consumed, and formed into cell material. This cell material is assimilated by other organisms and converted into inorganic matter such as water, carbon dioxide, nitrates, phosphates, and similar salts. These compounds are carried downward in the migrating water. As the depth increases, the quantity of organic food material decreases, further modifying the microorganism population. Different microorganisms than those found in the upper portions of the sand predominate. These microorganisms utilize oxygen in the water, and extract nutrients in solution that would otherwise pass unaffected through the sand. The resulting water leaving the slow sand filter is virtually free of suspended solids, colloids, microorganisms, and complex salts, and contains only simple, relatively innocuous inorganic salts.

During the 20-day seasoning period of the water purification reactor 10, a schmutzdecke, will develop along the top surface of the fine sand layer 68. For this biological layer to properly develop, contaminated water 70 should cover the top surface of the fine sand layer 68 at a depth of 1-3 cm at all times during use of the reactor 10.

Water flows more rapidly through a water purification reactor, constructed as described herein but without the addition of a disinfectant, than through a slow sand filter. Consequently, such a water purification reactor is not as effective as a slow sand filter in removing all pathogens from water. Nevertheless, it has been found that pathogens such as E. coli and TFCC can be reduced by up to 80-90%. The addition of a metallic disinfectant, however, has been found to reduce pathogens by more than 99%.

It has been found that, within the fine sand layer 68 at a height of approximately ⅓ the total height of the sand layer 68, virtually all oxygen has been removed from the water through biological activity. It is at and below this elevation that the metallic disinfectant can be distributed. Each sand particle supports adsorbed resident microorganisms that originate from other than the contaminated water 70. In the fine sand/disinfectant layer 66, these microorganisms evolve into a metallic disinfectant-tolerant species, thereby effectively remediating this biota. Pathogenic microorganisms entering the fine sand/disinfectant layer 66 are intercepted, consumed, and broken down by these resident microorganisms, and also are remediated by the metal ions. The evolved microorganisms remain in the fine sand/disinfectant layer 66 to continue their activity in removing pathogenic microorganisms.

The potable water 72 discharged from the water purification reactor 10 contains essentially no pathogenic microorganisms, and meets or exceeds World Health Organization drinking water standards. Further, a small concentration of metal in solution that is consistent with human health is present in the potable water 72, which retards the reemergence of pathogens during movement and storage of the water.

Several phenomena have been observed which are responsible for the efficacy of the water purification process described herein. These phenomena have been completely unexpected, and include the interaction between metal ions and the surface of the sand particles, the interaction between the microorganisms resident on the sand particles and the metal ions leading to the evolution of the resident microorganisms in response to the metal ions, the effect of the metal ions and the evolved microorganisms on the transient microorganisms passing through the purification medium thereby enhancing the removal of the transient pathogenic microorganisms, and the presence in the purified water of a small concentration of metal ions in solution that can prevent re-contamination during the time the water is stored and utilized.

The chemical/biochemical water purification reactor 10 described herein is simple to construct and use, can utilize local materials, and is economical in terms of cost per volume of potable water. An important factor in accelerating the use of the reactor throughout developing countries is the involvement of local populations utilizing local labor and local resources in the manufacture, business development, and distribution of reactors. Incorporating the reactor into an economic framework can be effective in initiating and sustaining such development and distribution. In particular, structuring sustainable development and distribution around a locally based economic framework can be more effective than doing so utilizing resources, labor, and management provided by outside sources, with little or no local involvement.

Figure 3:
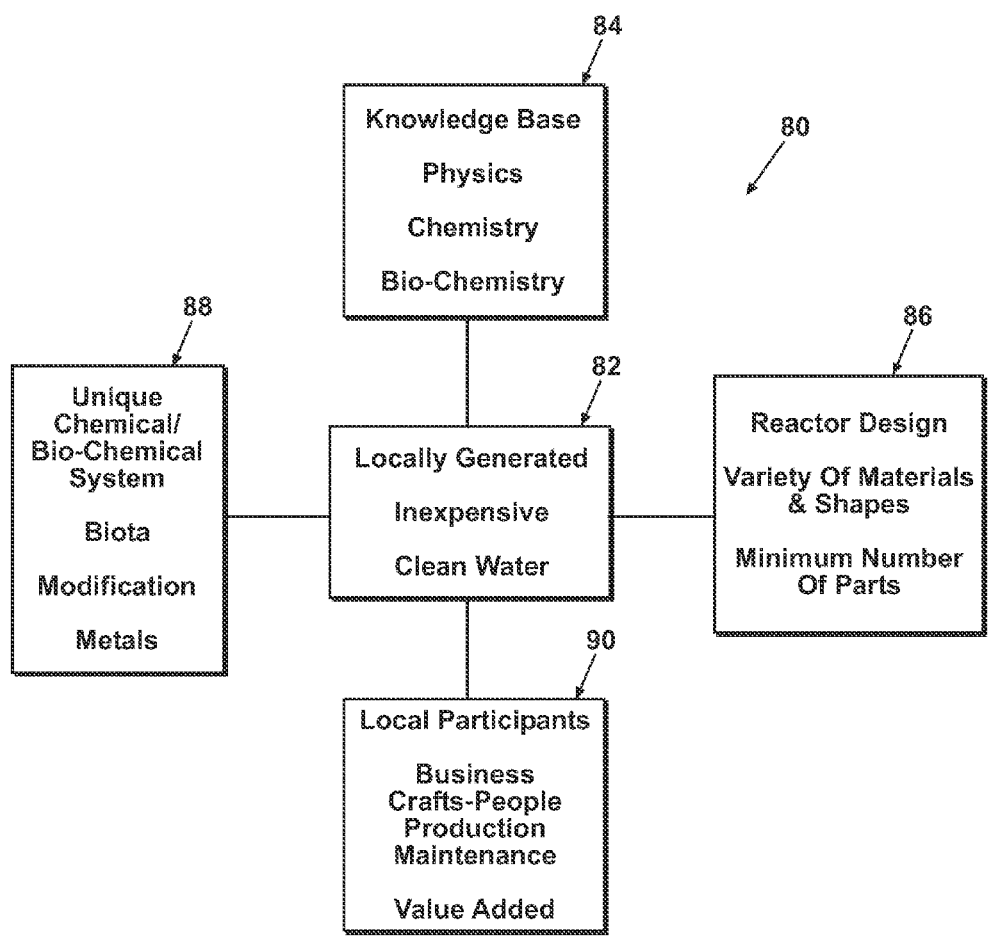
FIG. 3 is a schematic representation of an alternate embodiment of the invention comprising an economic framework incorporating a knowledge base of scientific principles, the essential elements of the chemical/biochemical water purification system, the principles underlying the design and fabrication of the water purification reactor, the human element contributing to the self sustainability of the economic framework, and the objective of the economic framework.

FIG. 3 illustrates the conceptual basis for an economic framework 80 on which the development and distribution of the chemical/biochemical water purification reactor 10 can be based. The fundamental local goals 82 include the generation of clean water in sufficient quantities, utilizing local resources and labor, in an affordable manner. The chemical/biochemical water purification reactor 10 can achieve each of these goals.

The construction and performance of the water purification reactor 10 are based on fundamental technological principles 84 such as physics, including fluid flow through porous media, chemistry, and biochemistry. Utilizing these technological principles 84 the reactor 10 can be engineered 86 to accommodate a variety of materials and configurations, utilizing a minimum of components. Reactor engineering 86 is driven by an enhanced reactor performance 88 resulting from a unique chemical/biochemical system based upon an understanding and utilization of both pathogenic and remedial microorganisms, metal compounds, and their interaction. Local participants can then serve in one or more functions, such as business operations, reactor production and maintenance, resource acquisition, and the like. Contributions by local participants will be selected and defined so as to optimize the local value added by the participants.

Local businesspeople can be engaged to construct and market reactors utilizing local craftspeople, using local materials, for sale to the local population in established local markets. Because local craftspeople and local materials are utilized, and the distribution network is modest, the local population can afford to purchase reactors. As an example, a typical reactor may cost $10-$11 to construct, and can be sold for approximately $15, a cost that is considered affordable by most populations in developing countries. Annual maintenance costs are projected to be approximately $1 per year. The typical reactor has a projected life of 5-10 years, and can purify 30-40 liters of water per day. The cost per liter of water is approximately $0.0004. The value of eliminating human health and suffering from contaminated drinking water is incalculable.

The business component of the economic framework is the most critical for sustaining the development and distribution of the chemical/biochemical water purification reactor. Resources will be predetermined based upon what is available near a selected population. Local resources will be utilized and, if necessary, modified or supplemented to provide the necessary reactor components. Local jobs will be created utilizing the local labor pool available from the local population. Participating individuals can be educated and trained in the construction and operation of the reactor. However, in the absence of a management system based on established business principles, it is unlikely that the local population will be successful in maintaining development and distribution of the reactors.

The economic framework can incorporate several elements comprising a microfranchising system. The first element can include defining the local population and its location. If an outside organization is involved for funding, training, consulting, and the like, a contact person representing the outside organization can be identified. Similarly, a contact from the local population, such as a local businessperson, a person with technological expertise, or an individual with recognized authority within the local population, can be identified. These individuals can constitute the primary liaison between the outside organization and the local population.

Other key personnel involved in the microfranchising program can include individuals with applicable specialized experience, other organizations having an established relationship with the local population, and future contributors, e.g. tourists providing revenue to the local economy.

The franchisee, who may be the future business owner, can be identified, along with the franchisee's prior business-related experience and skills. The local market can be identified, along with the facility to be utilized for reactor fabrication. Such things as per capita income, employment levels, skills, and the like, can be identified. Potential future markets, i.e. other localized populations, can also be identified. Goals for providing reactors sufficient to provide clean water to all members of the local population, including a time line, can be established, along with goals for expanding the business to potential future markets.

The local water source requiring remediation can be identified, along with illnesses resulting from utilization of the water source. Factors, including economic factors, which drive the selection of water sources by the local population, can be identified, along with water quality test results, if available.

The local communication network can be identified, along with the anticipated labor pool, and whether persons involved in the construction of the reactors will be paid. Availability of materials, and the anticipated material costs, can be identified, along with the means by which the materials will be delivered to the reactor fabrication site. The availability of needed tools, and sources of such tools, can also be identified.

Estimated startup costs can be identified, along with sources providing startup funding. Anticipated costs of fabrication after startup, and revenue derived from the sale of reactors, can also be identified to ensure the business is self-sustaining.

Programs for skills training, such as identification of suitable material sources, preparation of materials, fabrication of reactors, seasoning and maintenance of reactors, business record keeping, and the like, can also be established. An ongoing system for providing assistance, if necessary, to the franchisee, such as technological assistance in the event of an unexpected problem with the operation of a reactor, can also be established utilizing, for example, an outside organization.

The goal of the economic framework is the establishment and sustainability of a business plan for the development and distribution of chemical/biochemical water purification reactors, and the expansion of the business into progressively larger markets. This can contribute to the economic development of a local population and its individual members, facilitate local interest in the further development of community health, technology, and business skills, and, most importantly, reduce significantly the morbidity and mortality associated with contaminated drinking water in developing countries.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A water purification reactor for remediating pathogenic microorganisms in water, the water purification reactor comprising:
   a containment vessel having a perimetric wall, a first end having a bottom wall, and a second opposed end defining an opening, the perimetric wall having a discharge opening therethrough and, with the bottom wall, defining a chamber;
   a discharge assembly associated with the chamber, comprising a collection pipe extending along the bottom wall, a siphon pipe fluidly coupled with the collection pipe and extending along the perimetric wall away from the bottom wall, and an exit pipe fluidly coupled with the siphon pipe and extending through the discharge opening;
   a water purification medium comprising at least one layer of granular material contained within the chamber, containing and sustaining a biological layer of microorganisms for reducing water-borne pathogenic microorganisms; and
   an inorganic disinfectant source having anti-microbial properties incorporated into a portion of the water purification medium;
   wherein the water purification medium and biological layer of microorganisms are adapted for progressive biochemical remediation of the pathogenic microorganisms;
   wherein the inorganic disinfectant source is adapted for progressive chemical and biochemical remediation of pathogenic microorganisms; and
   whereby water containing pathogenic microorganisms percolates through the water purification medium, and flows into and discharges from the discharge assembly as potable water.

2. A water purification reactor according to claim 1 wherein progressive chemical and biochemical remediation comprises transformation of pathogenic microorganisms into innocuous materials.

3. A water purification reactor according to claim 1 wherein the discharge assembly is fabricated of one of polymeric pipe, copper pipe, iron pipe, and steel pipe.

4. A water purification reactor according to claim 1, and further comprising a delivery pipe fluidly coupled with the exit pipe.

5. A water purification reactor according to claim 1 wherein the at least one layer of granular material comprises at least two parallel layers of granular material, the granular material comprising each layer characterized by a disparate grain size distribution.

6. A water purification reactor according to claim 1 wherein the at least one layer of granular material extends a distance away from the bottom wall no greater than the distance from the bottom wall to the discharge opening.

7. A water purification reactor according to claim 1 wherein water in the chamber extends no less than 1 cm above the top surface of the water purification medium.

8. A water purification reactor according to claim 1 wherein the inorganic disinfectant source comprises one of a metal, a metal salt, a metal alloy, and activated charcoal impregnated with a metal.

9. A water purification reactor according to claim 8 wherein the metal comprises one of silver, copper, gold, zinc, cadmium, mercury, nickel, cobalt, iron, manganese, chromium, tin, lead, arsenic, bismuth, and beryllium.

10. A water purification reactor according to claim 8 wherein the inorganic disinfectant source in the water purification reactor releases metal ions into water, and wherein the concentration of metal ions in solution is no less than 0.5 parts per million and no greater than 1.5 parts per million.

11. A water purification reactor according to claim 1 wherein the biological layer of microorganisms overlies the water purification medium to provide initial removal of pathogenic microorganisms in the water.

12. A method of remediating pathogenic microorganism in water comprising:
   providing a water purification reactor having
      a containment vessel having a perimetric wall, a first end having a bottom wall, and a second opposed end defining an opening, the perimetric wall having a discharge opening therethrough and, with the bottom wall, defining a chamber;
      a discharge assembly associated with the chamber, comprising a collection pipe extending along the bottom wall, a siphon pipe fluidly coupled with the collection pipe and extending along the perimetric wall away from the bottom wall, and an exit pipe fluidly coupled with the siphon pipe and extending through the discharge opening;
      a water purification medium comprising at least one layer of granular material contained within the chamber, containing and sustaining a biological layer of microorganisms for reducing water-borne pathogenic microorganisms; and
      an inorganic disinfectant source having anti-microbial properties incorporated into a portion of the water purification medium;
      wherein the water purification medium and biological layer of microorganisms are adapted for progressive biochemical remediation of the pathogenic microorganisms; and
      wherein the inorganic disinfectant source is adapted for progressive chemical and biochemical remediation of pathogenic microorganisms;
   providing water containing pathogenic microorganisms to the reactor to percolate through the water purification medium, and
   flowing the water into the discharge assembly and discharging the water as potable water.

* * * * *